April 17, 1934.  A. G. JOANNIDES  1,954,876
MOUNTING OF OBJECTIVES FOR USE WITH CINEMATOGRAPH AND LIKE PROJECTORS
Filed April 6, 1933  3 Sheets-Sheet 1

ALEXANDRE GEORGES JOANNIDES
INVENTOR
BY Haseltine, Lake & Co.
ATTORNEYS

April 17, 1934.   A. G. JOANNIDES   1,954,876
MOUNTING OF OBJECTIVES FOR USE WITH CINEMATOGRAPH AND LIKE PROJECTORS
Filed April 6, 1933   3 Sheets-Sheet 2
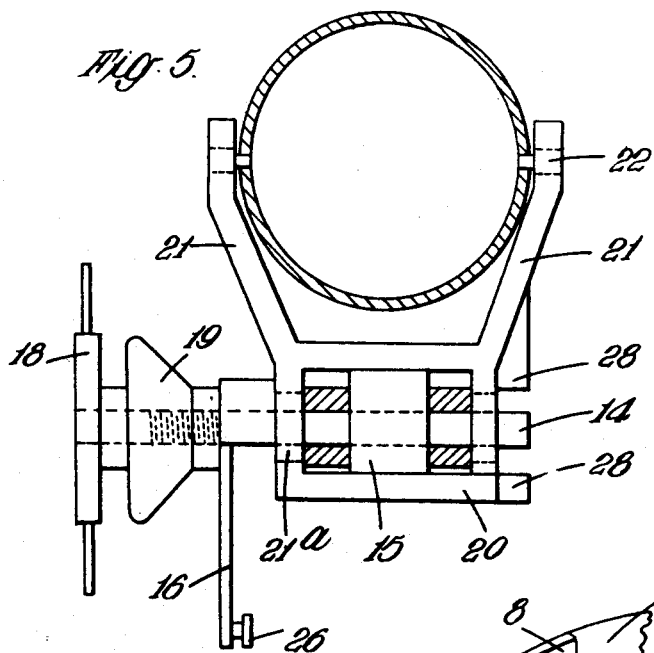
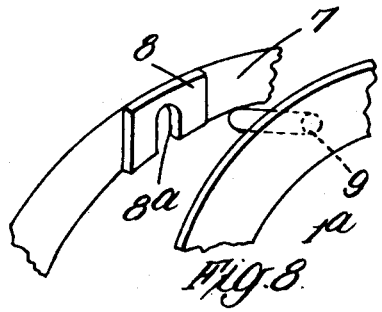
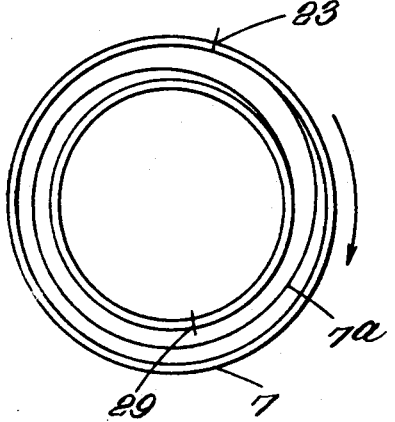
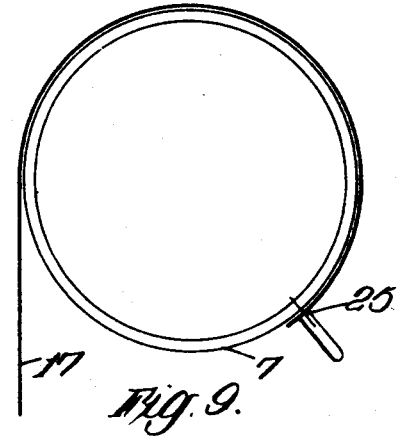
ALEXANDRE GEORGES JOANNIDES
INVENTOR

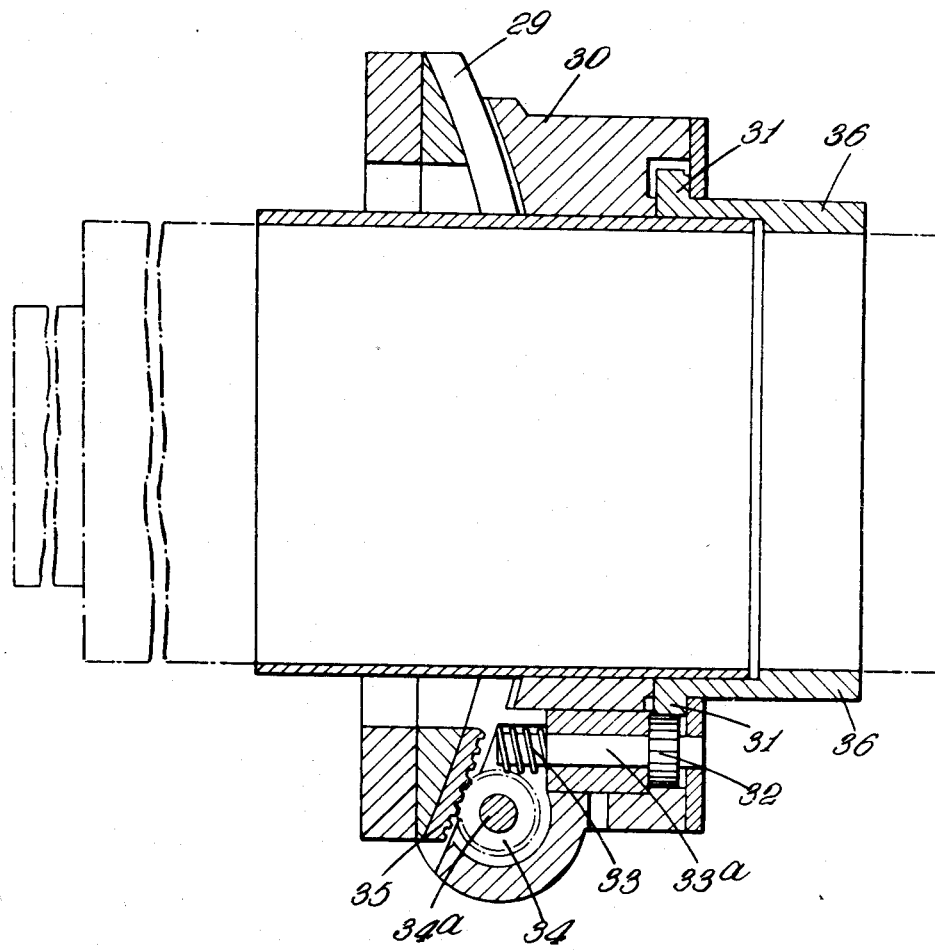

Patented Apr. 17, 1934

1,954,876

UNITED STATES PATENT OFFICE 1,954,876

MOUNTING OF OBJECTIVES FOR USE WITH CINEMATOGRAPHS AND LIKE PROJECTORS

Alexandre Georges Joannides, Paris, France, assignor to Societe pour l'Exploitation des Brevets A. G. I., Paris, France Application April 6, 1933, Serial No. 664,733
In France April 9, 1932

6 Claims. (Cl. 88—24)

This invention relates to the mounting of objectives for use with cinematographs and like projectors, the chief object of the invention being to provide means whereby the size of the image projected onto the screen can be increased or decreased as desired, whilst maintaining for the projected image a fixed base. The use of a fixed base for the image is rendered necessary in certain cases by the arrangement of the screen either for reasons of visibility or because the picture displayed makes it necessary that the base of the image should be made to coincide approximately with the level of the top of the stage.

According to the invention means are provided for varying the focal length of the objective and also the inclination of its axis in relation to the horizontal, simultaneously and in the correct proportion, so as to enable the size of the image projected onto the screen to be varied whilst at the same time maintaining a common fixed base. The variation in the focal length and inclination of the axis of the objective is preferably controlled by means of a common operating member.

The objective may be independent of the projector and may be mounted on any suitable support either by means of screws to the front of the apparatus, as for example in the Gaumont and Simplex apparatus, or by a supporting collar made fast to the arm of the objective as in the M. I. P. and Ernemann apparatus and like, or it may be mounted by means of an arm carried on the base if the projecting apparatus is not of a sufficiently strong construction.

Referring to the drawings:—

Figure 5 is an end view of the same partly in section.

Figure 1:
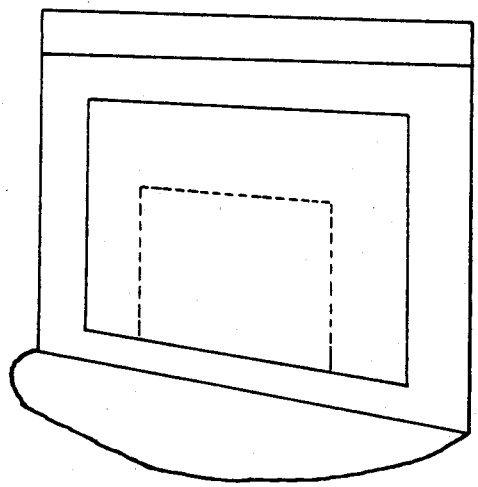
Figure 1 is a perspective view of a cinematograph screen showing the border lines in full and dotted lines respectively of a large and small image having a common fixed base.

Figures 6, 7, 8, and 9 are views illustrating details of construction.

Figure 10 is a sectional view illustrating an alternative form of objective mounting.

In the construction shown by Figures 4 to 9 of the accompanying drawings the objective 1 is of the variable focussing type, the distance separating the lenses being variable by rotating the forward lens ring 1a, the various lens carrying tubes being connected together by means of suitable pin and inclined slot connections. The objective 1 is slidably mounted within a surrounding cylindrical body 2, its position being adjustable therein by means of an eccentrically arranged pin 3 entering a hole in the body of the objective, the pin being rotatable by the milled head 3a. The pin is also displaceable longitudinally of the casing, the pin being mounted within a sliding carriage 4, movement of which is controlled by a milled nut 6 enclosed within a slot in the carriage and in screw-threaded engagement with a threaded rod 5 connected rigidly with the carriage, a coiled spring being provided for taking up any backlash. A hollow ring 7 is rotatably mounted upon the forward end of the body 2, the front surface of the ring carrying a driving member 8 (see Figures 4 and 8) having a slot 8a which is engaged by a pin 9 carried by a flange on the forward lens ring whereby rotational movement of the hollow ring 7 about the axis of the casing will cause the forward lens ring to rotate, thereby varying the focus of the objective.

Figure 2:
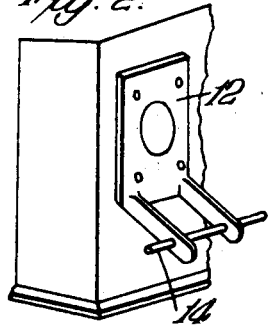
Figures 2 and 3 show alternative methods of supporting the objective mounting upon a projector or other support.
Figure 3:
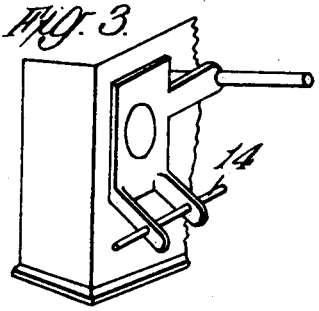
Figure 7:
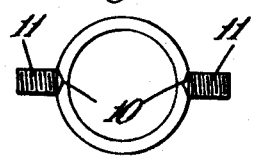
Figure 4:
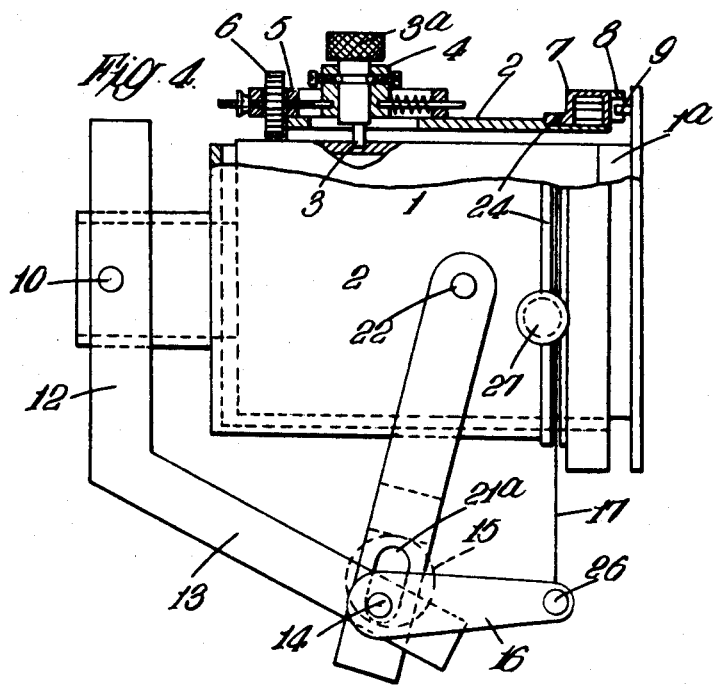
Figure 4 is a side elevation partly in section illustrating one construction of objective mounting, according to the invention.

In order to enable the axis of the cylindrical body and its associated objective to be inclined to a greater or less extent the cylindrical body 2 is provided at its rear end with bearing surfaces 10 which are engaged by pointed bearing screws 11 carried by a supporting member adapted to be secured to the projector or other suitable supporting surface either by means of screws as in Figure 2 or by a collar on the arm carrying the objective, as in Figure 3. The supporting member 12 is provided with two forwardly projecting arms 13 through which is passed a shaft 14 on which are rigidly mounted an eccentric or cam 15, a lever 16 for the attachment of a cable 17 and a capstan or hand-wheel 18. A milled locking nut 19 is also mounted upon a threaded portion of the shaft to enable the eccentric or cam 15 to be locked in any desired angular position. A cage 20 is provided engaging the operative faces of the eccentric or cam, the walls of the cage being slotted at 21a for the passage of the shaft 14 so that the cage has a restricted upward and downward movement. The cage is provided with upstanding fork-like arms 21 carrying trunnions 22 at their upper ends engaging suitable bearing surfaces formed in the cylindrical body 2. By this arrangement rotational movement of the hand-wheel 18 will cause a partial rotary movement of the cylindrical body about its pivot points 10, due to the engagement of the operating face of the eccentric with the adjacent surface of the cage.

A spring 7a is located within the tubular ring 7, the one end of the spring being secured to the body 2 at 29, the opposite end of the spring being connected to the tubular ring at 23 (see Figure 6). The spring may be of any suitable form, for example, a spiral spring, gramophone spring or any other suitable type which when stressed will tend to rotate the tubular ring with respect to the body 2 containing the objective. A flange on the ring 7 is provided with a peripheral groove 24 (see Figure 4) which is adapted to receive the cable 17, the one end of which is connected to the lever 16, the opposite end being connected to the tubular ring 7 at 25 (see Figure 9). A guide roller 27 mounted on the body 2 and with which the cable contacts ensures the cable engaging the peripheral groove whatever its inclination may be as a result of the rotation of the lever 16. The cage may be provided with two bearing surfaces 28 (see Figure 5) which may include adjustable screws which are adapted to engage the shaft 14 at each terminal position of the cage in order to limit movement of the cage in an upward and downward direction.

In operation, the projection of pictures of various sizes onto the screen while preserving a common base, entails several operations which may be carried out simultaneously and automatically by means of the apparatus just described. Should the operator wish to vary the size of the image projected onto the screen it is merely necessary for him to turn the hand-wheel or capstan in the appropriate direction, thereby causing the eccentric or cam to turn about the axis of its supporting shaft and cause the cage to be moved in an upward or downward direction, thereby causing the body 2 and its associated objective to turn about the bearing surfaces 10. At the same time the lever 16 is turned due to it being rigidly mounted upon the shaft 14 and a rotational movement is given to the tubular ring 7 which is connected to the forward lens ring, thereby varying the focal length of the objective simultaneously and in the correct proportion. Movement of the tubular ring in either direction is under the control of the cable and lever, the tubular ring being turned directly by the cable in the one direction and in the opposite direction by the spring which has been previously stressed.

In the alternative construction illustrated by Figure 10 the objective is again of the variable focus type and is mounted within a carriage 30 having a curved face adapted to slide over the correspondingly shaped face of a fixed guide plate 29, the parts being connected together by interengaging tongues and grooves, the walls of which are undercut to maintain the parts together. The guide plate is intended more particularly for use with a cinematograph projector such as the Gaumont, Simplex, M. I. P., Ernemann No. 2, Ernemann No. 3 and like apparatus and is provided with a projection at one side adapted to be clamped in position upon a suitable support. The curved face of the guide plate carries a fixed toothed rack 35 which is engaged by a pinion 34 secured to a shaft 34a rotatably mounted within suitable bearings in the carriage, the shaft carrying a worm-wheel disposed directly behind the pinion 34 and consequently not shown in the drawings, the worm-wheel being driven by a worm 33 carried by a shaft 33a, this shaft carrying a pinion 32 which is driven by a toothed gear ring 31 upon a tubular sleeve 36 to which the rotatable lens ring of the objective is connected, for example, by a pin-and-slot connection.

In operation, when the sleeve is rotated, and for this purpose it may be provided with a suitable lever (not shown), the focal length of the objective will be varied, the pinion 32 being at the same time rotated by the engagement therewith of the gear ring 31, rotational movement being transmitted through the shaft 33a, worm 33, worm-wheel and pinion 34 to the rack 35, thereby causing the carriage to move over the surface of the curved guide plate, the axis of the objective being thereby inclined to a greater or less extent and in the correct proportion to the variation in the focal length of the objective, thereby enabling the size of the image projected on the screen to be varied as desired whilst maintaining a fixed base.

What I claim and desire to secure by Letters Patent of the United States is:—

1. An objective mounting for use with cinematographic projectors comprising an objective carrying member, an objective mounted therein, a curved guide plate upon which said objective carrying member is slidably mounted, a rotatable sleeve connected to said objective for varying the focal length of said objective, and means operated by said sleeve for causing said objective carrying member to be slid over said guide plate to vary the inclination of the axis of the said objective in relation to the horizontal.

2. An objective mounting for use with cinematographic projectors comprising an objective carrying member, an objective mounted therein, a curved guide plate upon which said objective carrying member is slidably mounted, a rotatable sleeve connected to said objective for varying the focal length of said objective, a toothed rack upon said guide plate, a gear ring upon said sleeve, pinion wheels in driving connection with said toothed rack and said gear ring, and a worm and worm-wheel connecting said pinions and causing rotational movement of said sleeve to cause a corresponding and proportional sliding movement of said objective carrying member over said guide plate.

3. An objective mounting for use with cinematographic projectors, comprising an objective carrying member, an objective mounted therein, and common operating means both for varying the focal length of said objective and simultaneously varying in correct proportion the inclination of the axis of said objective in relation to the horizon, in order to vary the size of the image projected upon the screen whilst at the same time maintaining a common fixed base for said projected image, and also maintaining the projected image constantly at all times in correct focus notwithstanding any variation in the size of said projected image.

4. An objective mounting for use with cinematographic projectors comprising an objective carrying member, an objective mounted therein, pivots for said objective carrying member upon which the same is pivoted at its rearward end, an eccentric for turning said objective carrying member about its pivots, means for turning said eccentric, and means for simultaneously varying the focal length of said objective.

5. An objective mounting for use with cinematographic projectors comprising an objective carrying member, an objective mounted therein, pivots for said objective carrying member upon which the same is pivoted at its rearward end, an eccentric for turning said objective carrying member about its pivots, means for turning said eccentric, a lever associated with said eccentric, a rotatable ring associated with said objective for varying the focal length of said objective, and a cable connecting said lever to said ring for imparting a rotational movement to said ring when said eccentric is turned.

6. An objective mounting for use with cinematographic projectors comprising an objective carrying member, an objective mounted therein, pivots for said objective carrying member upon which the same is pivoted at its rearward end, an eccentric for turning said objective carrying member about its pivots, means for turning said eccentric, a rotatable ring associated with said objective for varying the focal length of said objective, a cable connecting said lever to said ring for imparting a rotational movement to said ring when said eccentric is turned, and a spring associated with said ring for returning said ring to its normal position when the tension on said cable is relaxed.

ALEXANDRE GEORGES JOANNIDES.